United States Patent [19]

Aoyama et al.

[11] Patent Number: 4,817,707

[45] Date of Patent: Apr. 4, 1989

[54] HEATING SOFT FLOOR MAT

[75] Inventors: Kazuo Aoyama, Chiba; Yukitaka Murata, Tokyo; Kiyoshi Hattori, Tokyo; Akio Okamoto, Tokyo; Kiyoshi Takahashi, Ibaraki; Takashi Sasaki, Ibaraki; Shigeko Hanari, Ibaraki, all of Japan

[73] Assignees: Ryowa Corporation; Tokyo Gas Co., Ltd., both of Tokyo, Japan

[21] Appl. No.: 99,018

[22] Filed: Sep. 21, 1987

[30] Foreign Application Priority Data

Sep. 26, 1986 [JP] Japan .............................. 61-146481[U]
Sep. 26, 1986 [JP] Japan .............................. 61-146483[U]
Dec. 23, 1986 [JP] Japan .............................. 61-196765[U]

[51] Int. Cl.$^4$ ........................... F28F 21/06; F28F 1/00
[52] U.S. Cl. ....................................... 165/46; 165/56; 165/49; 165/905; 237/69
[58] Field of Search ................... 165/46, 86, 905, 49; 237/69

[56] References Cited

U.S. PATENT DOCUMENTS 4,619,801 10/1986 Engel .................................. 165/56
4,653,729 3/1987 Ando .................................. 237/69
4,693,302 9/1987 Dodds ................................ 165/905

FOREIGN PATENT DOCUMENTS 2359446  6/1975 Fed. Rep. of Germany ........ 237/69
2614694 10/1977 Fed. Rep. of Germany ........ 237/69
2841225  4/1980 Fed. Rep. of Germany .
0041443  3/1977 Japan ................................. 165/49
 116714  8/1984 Japan .
 060608  4/1985 Japan .
0182694  6/1981 U.S.S.R. .......................... 165/905

OTHER PUBLICATIONS

*Cahiers du Centre Scientifique et Technique du Batiment*, No. 245, Dec. 1983, pp. 1–11, "Avis sur le Systeme de Canalisations. . . ".

Primary Examiner—Samuel Scott
Assistant Examiner—John K. Ford
Attorney, Agent, or Firm—Oblon, Fisher, Spivak, McClelland & Maier

[57] ABSTRACT

A heating soft floor mat is described comprising a base sheet composed of a thermoplastic resin foamed article as a heat insulating layer having meanderingly formed thereon grooves for conduits, conduits for heating medium disposed in the grooves, and cover material having flexibility covering the surface side thereof, wherein the thermoplastic resin foamed article is a crosslinked polyethylene foamed article containing closed cells having a degree of expansion of from 10 to 40 and the conduits are composed of low density crosslinked polyethylene having a density of less than 0.910 g/cm$^3$.

2 Claims, 2 Drawing Sheets

F I G. 1
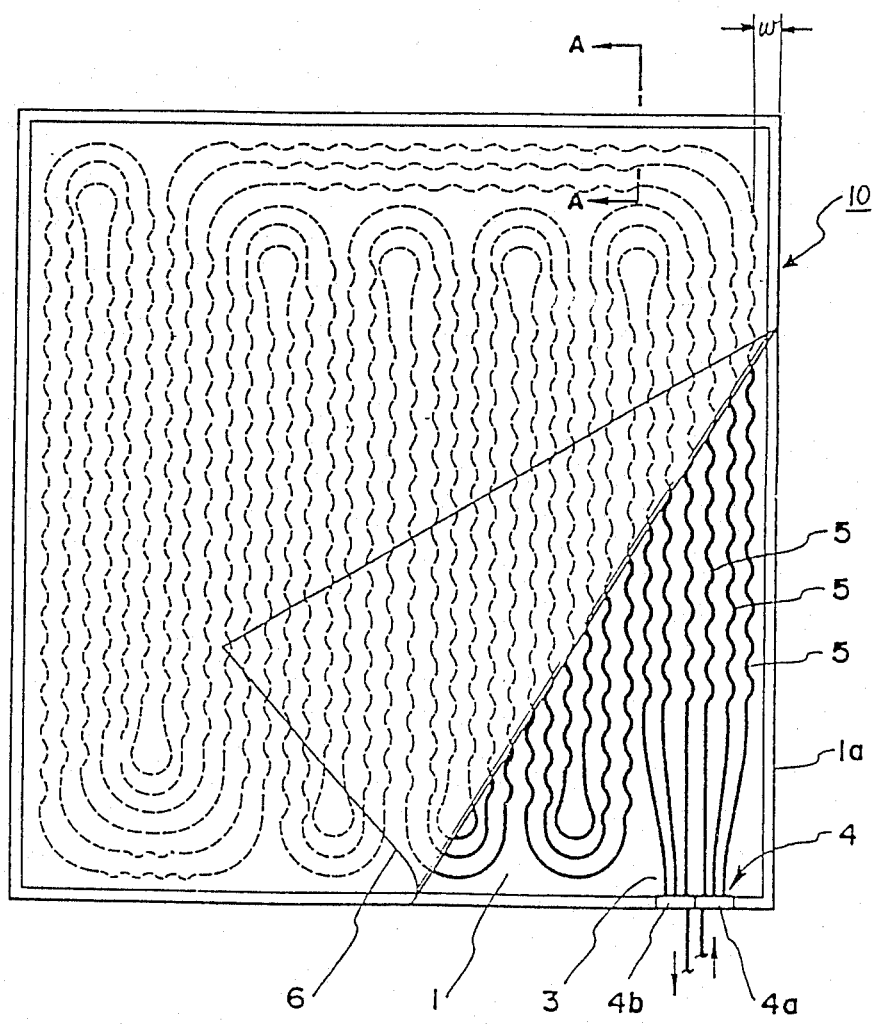

HEATING SOFT FLOOR MAT

FIELD OF THE INVENTION

This invention relates to a heating floor mat which is laid on a floor in room at use, and more particularly to a heating soft floor mat using a heating fluid such as warm water as heating medium.

BACKGROUND OF THE INVENTION

As a flexible heating soft floor mat using a heating fluid such as warm water, etc., as heating medium, there is generally known a structure that conduits for passing a heating medium are meanderingly disposed on base sheet which forms a heat insulating layer for mat and a cover material is placed on the surface side thereof. Also, as the material for the base sheet, expanded polyurethane (see Japanese Laid-Open Utility Model Application No. 96515/85), sponge (see Japanese Laid-Open Utility Model Application No. 146215/85), or a polyethylene uncrosslinked foamed article (see Japanese Laid-Open Utility Model Application No. 60608/85) is used.

Also, as the material for conduits, a heat resistant rubber (see Japanese Laid-Open Utility Model Application No. 146215/85) or a synthetic resin such as polyvinyl chloride and polyethylene (see Japanese Laid-Open Utility Model Application No. 96515/85) is used. Furthermore, it is known to use crosslinked polyethylene (see, e.g., Japanese Laid-Open Utility Model Application No. 116714/84).

However, in the case of using the conventional base sheet on which conduits are disposed, there are such problems that the base sheet is greatly deformed at use due to the poor heat resistance thereof, an attempt of imparting heat resistance to the material reduces the flexibility to reduce the adaptability to floor and feeling thereof, and also the material for the base sheet has a high heat transferability due to the continuous cells thereof, which results in causing large heat loss.

Also, when conduits are composed of a rubber or polyvinyl chloride, there are problems of reducing the heat aging resistance and the pressure resistance thereof by the action of heating medium. On the other hand, conduits composed of ordinary polyethylene (density of from 0.910 to 0.925 g/cm$^3$) are insufficient in flexibility, which inevitably gives trouble for keeping the flexibility (e.g., rolling up property of mat) of heating floor mat. Thus, means for solving these problems have been desired.

Furthermore, in the case of using conduits composed of crosslinked polyethylene having high rigidity, there are such problems that when conduits extend by causing heat expansion at passage of heating medium, the heat expansion force is concentrated to curved portions of the conduit meanderingly disposed, with it being transferred and hence the conduit is expanded at the curved portions to rise and abnormally deform the mat, whereby the mat gives feeling of incongruity and poor habitability at use.

SUMMARY OF THE INVENTION

This invention has been made for solving the above-described problems.

The first object of this invention is to provide a heating soft floor mat having improved heat resistance without reducing the flexibility as the base sheet for the mat, giving less heat loss, and using conduits having far improved durability and flexibility by being all equipped with heat aging resistance, pressure resistance and flexibility required for conduits for passing heating medium, whereby handling thereof is facilitated by the excellent flexibility and at the same time it can form a good heating atmosphere even in the case of using it together with an ordinary carpet.

The second object of this invention is to provide a heating soft floor mat which is so improved that the occurrence of local deformation of the mat can be prevented by almost uniformly dispersing the heat expansion force of conduits meanderingly disposed over the whole length of the conduits.

It has now been discovered that the first object of this invention described above can be attained by a heating soft floor mat comprising a base sheet composed of a thermoplastic resin foamed article as a heat insulating layer having meanderingly formed thereon grooves for conduits, conduits for heating medium disposed in the grooves, and cover material having flexibility covering the surface side thereof, wherein the thermoplastic resin foamed article is a crosslinked polyethylene foamed article containing closed cells having a degree of expansion of from 10 to 40 and the conduits are composed of low density crosslinked polyethylene having a density of less than 0.910 g/cm$^3$.

Furthermore, it has also been discovered that the second object of this invention described above can be attained by the aforesaid heating soft floor mat, wherein the conduits are wavily disposed with an amplitude a and a wave pitch p in the limited range of $\frac{1}{4}d \leq a \leq 10d$ and $2d \leq p \leq 125d$, wherein d is an outside diameter of the conduit.

BRIEF DESCRIPTION OF THE DRAWINGS

FIG. 1 is a schematic plane view of an example of the heating soft floor mat of this invention with a cover material partially peeled.

DETAILED DESCRIPTION OF THE INVENTION

Then, the invention is explained in detail by referring to an example shown by the accompanying drawings.

Figure 2:
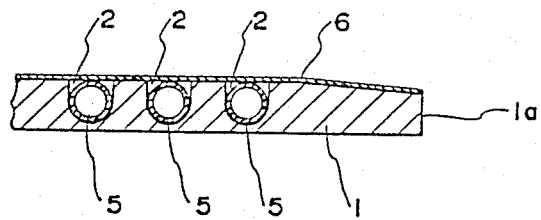
FIG. 2 is a sectional view taken along line A—A in FIG. 1.

In FIG. 1 and FIG. 2, a base sheet 1 which forms a heat insulating layer of a heating soft floor mat 10 is formed by a crosslinked polyethylene foamed article containing closed cells having a degree of expansion of from 10 to 40 and at the surface side of the base sheet 1 are formed three to five grooves 2 for conduit corresponding to the meandering pitch, the wave pitch, and the amplitude of conduits 5 which are meanderingly and wavily disposed and to the interval between the conduit disposing portion and a margin 1a of the base sheet 1. In the case of an example shown by the figures, three grooves 2 for conduit are formed and these grooves 2 are meanderingly and wavily formed in parallel to one another, and both ends of each groove 2 for conduit are gathered at a portion of the margin 1a of the base sheet 1. At the gathered portion 3 of the ends of the grooves 2 is set a header 4.

In each grooves 2, a conduit 5 for passing heating medium such as warm water, etc., is disposed, and the conduit 5 is formed by low density crosslinked polyethylene having a density of from 0.880 to 0.910 g/cm$^3$.

The meandering pitch of the conduits 5 is from 30 mm to 100 mm, and preferably from 30 mm to 80 mm, the interval w between the position of the conduit 5 disposed at the outermost side of these conduits and the margin 1a of the base sheet 1 is generally from 20 mm to 100 mm, and preferably from 30 mm to 80 mm, and the top portion and the end portion of each conduit 5 are connected to an inlet portion 4a and an outlet portion 4b of the header 4, respectively.

Figure 3:
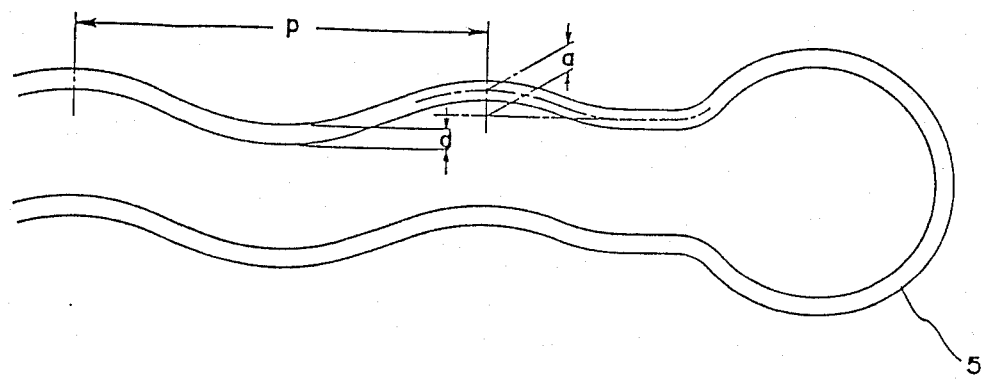
FIG. 3 is a partially enlarged plane view of a conduit at the disposition thereof.

Furthermore, as shown in FIG. 3, the conduits 5 are wavily disposed in the grooves 2 with the amplitude a and the wave pitch p of the conduit 5 itself in the defined range of $\frac{1}{4}d \leq a \leq 10d$ and $2d \leq p \leq 125d$, wherein d is the outside diameter of the conduit 5.

Also, a cover material 6 composed of a gas-permeable sheet having flexibility such as nonwoven fabric, woven fabric, etc., or a water-impermeable sheet such as a thermoplastic resin foamed sheet, a thermoplastic resin film, an aluminum foil, etc., is disposed over the surface of the base sheet 1 to provide a heating soft floor mat of this invention.

In the aforesaid constitution, if the degree of expansion of the crosslinked polyethylene foamed article which is the material for the base sheet 1 is less than 10, the base sheet is lacking in flexibility, while if the degree of expansion thereof is over 40, the base sheet 1 is lacking in compression resistance. In addition, the gel fraction of the base sheet 1 is from about 40% to about 90% and the thickness thereof is from about 3 mm to about 20 mm.

Also, if the density of low density crosslinked polyethylene which is the material for the conduits 5 is higher than 0.910 g/cm$^3$, the conduits 5 are lacking in flexibility, which results in reducing the flexibility of the heating soft floor mat 10.

In addition, when the thickness of the base sheet 1 is, for example, about 10 mm, the outside diameter of the conduit 5 is about 8 mm and the inside diameter thereof is about 5 mm, the raw material resin for the conduit 5 is produced by a copolymer of ethylene and an α-olefin, and the gel fraction thereof is from about 60% to about 90%.

Also, if the meandering pitch is less than 30 mm, the length of the conduit 5 disposed becomes too long, whereby the pressure loss of heating medium is increased and also the flexibility of the mat 10 itself is reduced, while if the meandering pitch is over 100 mm, the heat conduction from the conduit 5 to the cover material 6 is insufficient.

Furthermore, if the interval w between the margin 1a and the outermost portion for disposing conduit 5 is less than 20 mm, trimming at laying the mat 10 becomes difficult, while the aforesaid interval w is over 100 mm, the heat conduction from the conduit 5 to the peripheral portion of the mat 10 is insufficient.

Also, if the amplitude a of the conduit 5 itself is less than $\frac{1}{4}d$, the conduit 5 becomes substantially straight, whereby the effect of dispersing the heat expansion force at the all directions over the whole length is not obtained, while if the amplitude a is over 10d, the form of piping is complicated and a practical piping pattern is not obtained.

On the other hand, if the wave pitch p of the conduit 5 is less than 2d, the piping work becomes difficult to lose the practicability thereof and also the dispersion effect for the heat expansion force of the conduit 5 is less. Also, if the wave pitch p is over 125d, the dispersion effect for the heat expansion force of the conduit 5 is less.

Then, a laying process of the heating soft floor mat of this invention is explained. That is, in, for example, a six-mat room (approximately 10 m$^2$ area), the heating soft floor mat 10 of this invention is laid thereon at the central portion of a floor space corresponding to two to three-mat area (approximately 3 to 5 m$^2$ area) and an underlay such as the same base sheet having no conduit, felt, etc., is laid on the floor at the area from the margins of the heating soft floor mat 10 to the corners of the floor with same face level as that of the heating soft floor mat 10. When felt is used, the marginal portions of the heating soft floor mat 10 are formed with gentle downward slope, as shown in FIG. 2, so that the thickness of the margins thereof is thinner by 1 to 2 mm than the thickness of the felt by the slope.

On the other hand, if a heat non-radiating portion having no conduits 5 is formed by extending the base sheet 1 over the periphery of the heating soft floor mat 10 so that the area of the heat non-radiating portion becomes from 15% to 75% of the sum of the area thereof and the heating soft floor mat 10, the heating soft floor mat 10 can be laid over the whole floor without using the underlay as described above. Thus, the aforesaid example is very effective for improving habitability. Also, according to this example, since the heating soft floor mat can be used by desirably applying trimming to the peripheral sides of the heat non-radiating portion in proportion to the state of the room, the heating soft floor mat is convenient for the work of previously laying the heating soft floor mat 10 on the floor of room in course of construction of a house.

Thus, when the heating soft floor mat 10 of this invention is directly laid on the floor of a room, an ordinary carpet is laid thereon, and a heating medium is passed through the conduits 5, the carpet is warmed through the cover material 6 to provide a comfortable heating atmosphere.

As described above, according to this invention, by passing a heating medium through the conduits, the cover material as the surface layer of the heating soft floor mat is heated to provide, as a matter of course, good heating atmosphere, as well as since the base sheet which is the heat insulating layer for the heating soft floor mat is formed by a crosslinked polyethylene foamed article containing closed cells having a degree of expansion of 10 to 40, the base sheet is excellent in flexibility and heat resistance and also overall heat transfer to the opposite side to the cover material side can be reduced. Accordingly, the problem of causing thermal deformation at use can be solved and at the same time, the heat loss can be reduced. Also, heat radiated from the conduits can be transmitted to the cover material side with good efficiency.

Furthermore, since the conduits for passing heating medium are formed by low density crosslinked polyethylene having a density of less than 0.910 g/cm$^3$, the conduits are excellent in various points of heat aging resistance, pressure resistance, and flexibility and thus by the application of the conduits, the durability and flexibility of the heating soft floor mat can be improved.

Moreover, since the conduits are wavily disposed, the heat expansion force of the conduits is dispersed throughout the whole length through the wave portions of itself, whereby the trouble by concentrating the heat expansion force at the curved portions of the conduits disposed is prevented, whereby the occurrence of deformation of the mat by local rising can be completely prevented.

Also, the heating soft floor mat of this invention has excellent flexibility and can be rolled up to considerable extent as well as has an advantage of convenient for transportation and storage with the light weight and can be safely used for a long period of time. Thus, the practical value of this invention is very large.

While the invention has been described in detail and with reference to specific embodiments thereof, it will be apparent to one skilled in the art that various changes and modifications can be made therein without departing from the spirit and scope thereof.

What is claimed is:

1. A heating soft floor mat comprising a base sheet composed of a thermoplastic resin foamed article as a heat insulating layer having meanderingly formed thereon grooves for conduits, conduits for heating medium disposed in the grooves, and cover material having flexibility covering the surface side thereof, wherein the thermoplastic resin foamed article is a crosslinked polyethylene foamed article containing closed cells having a degree of expansion of from 10 to 40 and the conduits are composed of low density crosslinked polyethylene having a density of less than 0.910 g/cm$^3$.

2. The heating soft floor mat as claimed in claim 1, wherein said conduits are wavily disposed with an amplitude a and a wave pitch p in the limited range of $\frac{1}{2}d \leq a \leq 10d$ and $2d \leq p \leq 125d$, wherein d is an outside diameter of the conduit.

* * * * *